Figures 1, 2, 3:
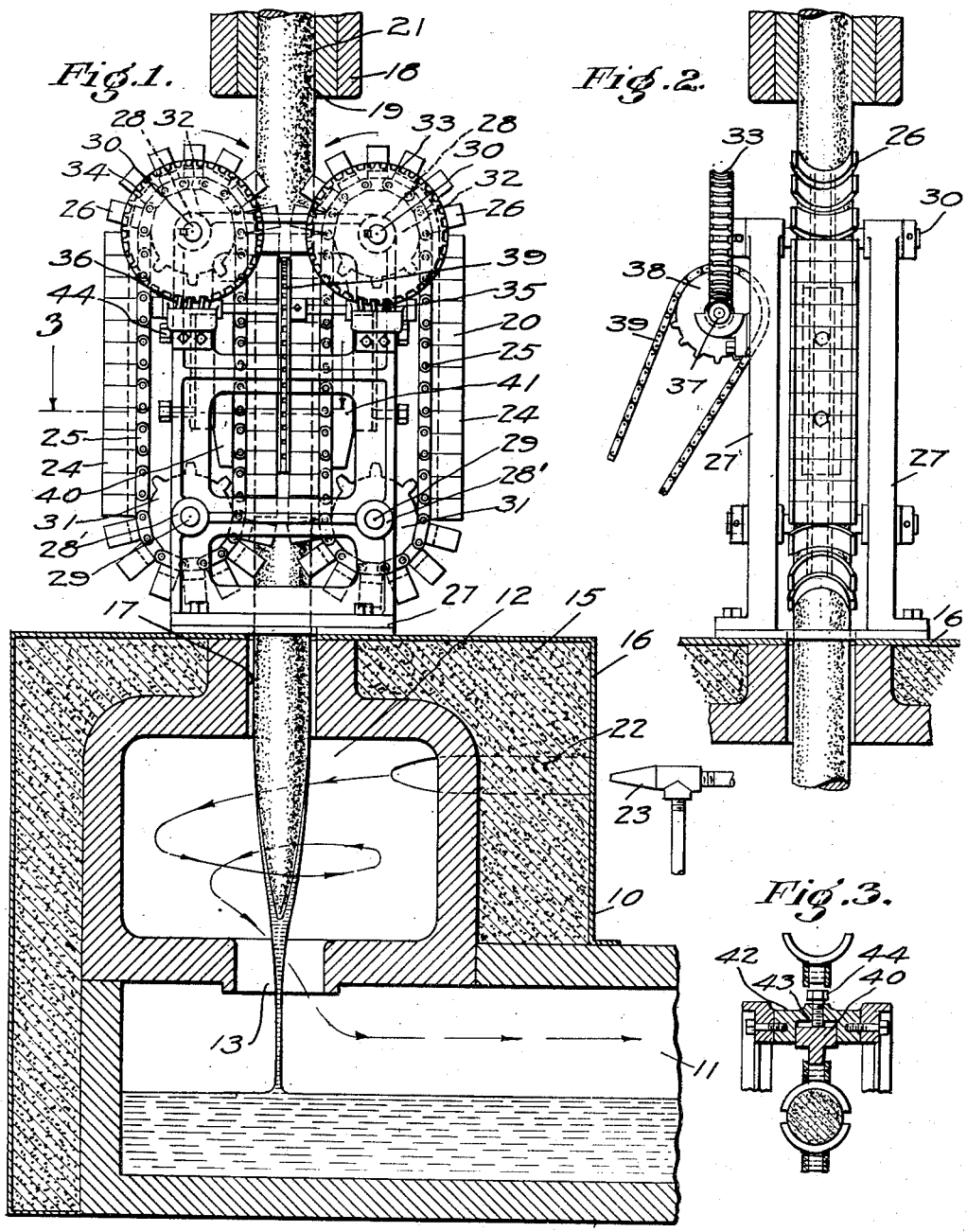

Aug. 30, 1932.  K. E. PEILER  1,874,799
METHOD AND APPARATUS FOR FEEDING AND MELTING GLASS BATCH
Filed Nov. 4, 1927

Witness:
Adolph C. Kaiser.

Inventor.
Karl E. Peiler.
by Robson & Brown
Attorney.

Patented Aug. 30, 1932

1,874,799

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

METHOD AND APPARATUS FOR FEEDING AND MELTING GLASS BATCH

Application filed November 4, 1927. Serial No. 231,014.

My invention relates to methods of and apparatus for feeding batch mixtures of glass-making materials into a melting furnace and for making glass therefrom.

It has heretofore been the practice, in the manufacture of glass, to melt the glass-making ingredients in the rearward end of large continuous tanks, in which large surfaces must be brought to the melting temperature to effect the adequate fusing and refining of the glass. The batch ingredients in these prior art devices are mixed in a dry state and are periodically fed, either mechanically or by hand, in substantial quantities directly into the tank and on top of previously melted glass standing therein. Fusion is accomplished by heat applied to the surface of the batch as it floats upon the heavier glass below it. This method of melting is extremely slow and the heating of large areas of furnace structure and glass for long periods of time in order to accomplish the complete vitrification of the batch and the elimination of air and gas is expensive. The raw batch so fed into these large tanks is often melted in contact with the walls of the tank and always in a bath of glass which is in such contact. As a result, rapid erosion of the walls takes place, which not only is destructive to the tank, but, through the introduction of material from the walls, causes changes in the composition and physical condition of the glass. Hence, the glass delivered at the working end of these furnaces is often of physical and chemical characteristics other than desired or expected. Furthermore, the old methods of melting the glass are slow, the arrangement of the tanks being such that in order to maintain the required balance of temperature for the different glass-making operations taking place therein, the melting temperature must be a compromise temperature and cannot exceed certain limits imposed by the heat requirements of operations other than melting. The balance of temperatures in such furnaces is often difficult to maintain, and when not properly maintained for the proper long periods of time unmelted batch or inadequately melted batch is often carried forward to the front end of the furnace and destroys the quality of the glass taken therefrom. My invention aids in the elimination of these and numerous other undesirable conditions often existing in these prior art furnaces.

Among the objects of my invention is the provision of a method and apparatus by which the glass batch is melted while out of contact with any refractory material and any previously melted glass. This tends to assure that the chemical and physical characteristics of the glass delivered from the furnace remain constant and as intended in the selection of the batch.

Another object of my invention is to provide methods and means by which the melting or fusing operation may take place rapidly at temperatures higher than those heretofore used and by which this temperature can be applied over a relatively small area of structure, but a relatively large surface of batch, thus increasing the speed and completeness of the fusing operation while reducing the amount of heat necessary to melt a unit of glass.

Another object is the provision of method and means for continuously feeding batch at constant rates and for continuously reducing the batch to completely fused glass having a minimum of included gases to be removed by later refining operations.

Another object of my invention is to continuously feed the batch at a regular, selected and constant rate and to melt the glass at a similar constant rate, whereby the level of the glass at the working end of the tank is maintained constant. The accomplishment of this object has a great advantage over the old methods, particularly when automatic means for delivering the glass from the furnace are used.

A further object of my invention is to provide methods and means whereby the batch is preformed into a solid stick or column and so fed into the melting zone, as distinguished from the old method of feeding dry pulverulent batch into the tank. The accomplishment of this object avoids the difficulty, present in the prior methods and caused by the currents of gases through the furnace which tend to separate and carry away through the flues and elsewhere the lighter constituents of dry batch.

Other objects of my invention will appear from the attached specification and claims.

Generally, my method comprises intimately mixing finely divided ingredients of the batch in the presence of moisture and extruding the mixture from a mill or through a die in a solid column, subjecting the column, as formed, to a setting treatment to harden it, and then feeding the column continuously end on into a melting chamber or zone in which the end portion of the column is suspended out of contact with the refractory walls. The melting chamber or zone is heated to a temperature sufficient for the rapid and complete melting of the end portions of the column, which portions, as they melt and form glass, pass directly into the glass batch in a refining or tempering chamber. I coordinate the rate of formation of the column and the feeding thereof into the chamber with the rate of melting of the end portions, so that the column is reduced by the melting at a rate corresponding to the rate at which it is fed further into the heated chamber.

My method may also provide a distinct step of preheating of the column to a temperature below the actual fluxing temperature before or as it passes into the melting chamber or zone, though this additional and distinct preheating may be omitted.

In the attached drawing, I have diagrammatically illustrated apparatus suitable for carrying out my novel method, in which Figure 1 is a view, partly in elevation and partly in vertical section;

Fig. 2 is a view in elevation of a portion of the apparatus of Fig. 1 taken from the right of Fig. 1; and Fig. 3 is a horizontal section of the structure shown in Fig. 1, taken on the line 3—3 thereof.

The apparatus shown in the drawing comprises a furnace or tank generally designated as 10 having a refining chamber or receptacle 11 and a melting compartment 12. The melting compartment is mounted above the refining chamber 11 and communicates therewith through an opening 13. Preferably, the entire tank and more particularly the melting chamber 12, has a lining 14 of high quality refractory material, such, for instance, as that disclosed in the patent to Paul G. Willetts, assignor to the Hartford-Empire Company, No. 1,605,885, dated Nov. 2, 1926. This lining 14 is surrounded by heat insulating material 15, such as sil-o-cel, and the entire structure may be encased in a suitable casing 16.

The melting chamber 12 is substantially cylindrical and has an axial opening or passage 17 at its top for the admission of batch thereinto. Preferably, the opening 13 in the bottom of the melting chamber 12 is also axial.

A mixing device, such as an auger mill, indicated at 18 and having an opening 19, in axial alignment with the opening 17 of the melting chamber, is provided and suitably spaced from the chamber to permit glass batch, which may be mixed in the presence of moisture therein and extruded therefrom, to undergo suitable setting operations prior to being fed into the chamber.

Between the mill 18 and the melting chamber, I provide one or more pairs of feeding devices, generally indicated at 20, to support and continuously feed the extruded column of batch-making material 21 toward and into the melting chamber.

The proper proportions of the several glass-making ingredients fed to the mixing device are intimately mixed therein in the presence of moisture and extruded as a column or stick at a selected rate through the opening 19. As this column issues from the opening 19 it begins to set, and at this point any suitable devices, such as burners or a preheating chamber (not shown), may be introduced to assist in setting of the column. The column of batch as fed is continuously moved downward by the feeding devices 20 at a constant selected rate to continuously position the end of the column into the melting compartment.

The compartment 12 is provided with a suitable aperture 22 through which may be projected the flame from a burner or other source of heat 23. Preferably, the opening 22 is such, and the burner 23 so arranged, that a flame tangential to the walls of the heating chamber will be projected thereinto. Such a flame will fully and evenly heat the walls and all interior portions of the melting chamber and will evenly heat all portions of the end of the column of batch-making material. The products of combustion may be carried off in any suitable manner, as for instance through the opening 13, thence above the surface of the glass in the container 11, as indicated by arrows, and through a suitable stack, not shown. A stack may be provided at any suitable point in the apparatus.

Any feeding mechanism adapted to feed the batch continuously and at a constant rate may be used. In the form shown in the drawing, it comprises one or more pairs of cooperating continuously moving series of forming members 24, each of which is made up of an endless chain 25 upon which is mounted a plurality of semi-cylindrical grippers 26, each adapted to cooperate with a similar member on the other chain of the pair to embrace the cylindrical column of batch and to carry it downward by the movement of the members. As shown, there is provided a pair of spaced rectangular frames 27, mounted on the casing 16 above the melting chamber, the frames carrying suitable upper and lower bearings 28 and 28' in which are mounted shafts 30 and 29, respectively. Each pair of shafts 29 and 30 respectively carry sprockets 31 and 32 on which one of the chains 25 is mounted. The upper shafts 30 respectively carry worm wheels 33 and 34 adapted to be driven respectively from the worms 35 and 36 mounted on a shaft 37 rotating in suitable bearings formed in an extension of the frame 27. The worms 35 and 36 are oppositely threaded to impart inward and downward movement to both chains 25. The shaft 37 also carries a sprocket 38 adapted to carry a driving chain 39 which may be driven from an electric motor or any other suitable source of power (not shown) at any selected and constant speed.

To insure proper gripping effect of the grippers 26 upon the column of batch during its effective feeding movement, I provide means for supporting the flexible chain 25 during the working portion of its path. Thus, guiding contact members 40 and 41 are provided to coact respectively with the chains 25 by forming a rubbing contact between such members and the back surface of the chains during the working portion of the path of movement of the chains. The guide members 40 and 41 are mounted in recesses or slots 43 in suitable cross members 42 connecting the frame members 27, and may be adjusted toward and from the column of batch by the screws 44.

The operation of the mechanism above described in the performance of my method is as follows—suitable batch ingredients are admitted in proper proportions into the mixing and extruding mill or device 18 together with such proportion of water as is necessary to render the mixture plastic, so that when extruded it retains the form imparted to it in passing the opening 19. The column of batch is hardened or set through exposure to the atmosphere or by suitable means provided in aid of this setting. As the column 21 passes downward, successive portions thereof are gripped by the successive pairs of grippers 26 and carried forward thereby as the chains 25 move downwardly. As each pair of grippers 26 comes into gripping relation with the column of batch, the links of the chain upon which they are carried comes into contact with the guide members 41 and 42, and the grippers are thus held in proper contacting relation with the column of batch.

The feeding device may be of any desired length, or a plurality of such devices may be used. The column of batch is introduced into the opening 17 in the top of the melting chamber and thence into the melting chamber, in which it is suspended out of contact with the bottom and side walls of the chamber. As the batch passes through the opening 17, it becomes preheated from the heat accumulating in that passage from the melting chamber. If desired, further and positive preheating of the batch may be had by the provision of a chamber similar to the melting chamber, but supplied with a less degree of heat, interposed between the melting chamber and the extruding device. As the end of the batch is moved downwardly through the opening 17 and into the melting chamber 12 proper, it is enveloped into the intensely heated atmosphere of that chamber. Its outer surface is rapidly fused and converted into glass which flows downwardly from the end of the batch column, through the opening 13 and into the refining chamber or receiving receptacle 11. It is thus apparent that the melting batch is never in contact with a refractory part of the melting chamber.

By this method, I am able to melt glass at a very high rate per unit of heated surface and to deliver, to the refining or working end of the tank, glass of uniform chemical and physical characteristics substantially unadulterated by elements contained in the refractory materials used in the furnace.

My novel method of melting is of particular value in connection with recent developments in the art of glass making, for instance, such as are described in the United States patent application of Vergil Mulholland, Serial No. 169,213, filed February 18, 1927, in which the glass is handled in narrow, shallow compartments which are heat separated from each other and which have separate heat control, though its use is not necessarily limited to that particular type of tank. My invention has great utility in all tanks in which it is desired either to decrease the time of melting per unit of heated area or in which it is desired to insure the uniformity of the glass finally made, or to maintain a constant level of the glass.

I have shown and described a device in which the column of glass is fed downwardly from the mixing mill and is suspended from above into the melting chamber. It is obvious that my method might be employed in a device which provides the entry into the melting chamber of the column of batch in some other direction, as for instance, horizontally or obliquely to the horizontal. It is also obvious that various modifications of the form and character of the melting chamber, the means for mixing and forming the column of batch, and the means for feeding it to the melting chamber may be varied within wide limits within the spirit of my invention, as set forth by the appended claims, which are to be construed as broadly as the art will permit.

I claim as my invention:

1. Apparatus for feeding and melting batch of glass-making material, comprising means for intimately mixing the batch ingredients and extruding the same in a solid continuous column, means for continuously feeding the same toward a melting means, means for directing a combustion flame into enveloping relation to the end of the column for melting off end portions thereof and thereby to form glass out of contact with any glass contaminating material, and means for receiving the glass so made.

2. Apparatus for making glass from batch of glass-making materials, comprising a melting compartment, means for continuously forming a column of batch, means for moving the column continuously toward and into the melting compartment and for suspending it therein out of contact with the bottom and walls thereof, means for preheating the column as it approaches the melting compartment, means for projecting a heating medium into the compartment and to cause it to move in an encircling path about the suspended column of batch to reduce the end portion of the column to molten glass, and means for receiving the glass so formed.

3. The method of feeding and melting glass making batch which comprises, continuously mixing glass making material in the presence of moisture and extruding the same in a rod-like form through a die, setting the material in such form, feeding and guiding said rod endwise through a preheating zone toward and into a melting chamber, suspending the rod of batch in the chamber out of contact with the bottom and side walls thereof, projecting a combustion flame into the chamber and into enveloping relation to the end of the suspended batch, to reduce the lower portion of the batch to melted glass, and flowing the melted glass downward from the end of the rod into a refining compartment.

4. Apparatus for making glass which comprises, a refining chamber, a melting chamber above the refining chamber, an open passage there between, means for continuously moving a solid column of molded batch into the melting chamber and suspending it therein above the passage and out of contact with the walls of the melting chamber, and means for creating a heated atmosphere in the melting chamber enveloping the suspended batch to reduce the end portions thereof to melted glass and as such to drop through the passage into the refining chamber.

Signed at Hartford, Connecticut, this 3rd day of November, 1927.

KARL E. PEILER.